United States Patent
Toader et al.

(10) Patent No.: US 10,777,361 B2
(45) Date of Patent: Sep. 15, 2020

(54) HYBRID CAPACITOR AND METHOD OF MANUFACTURING A CAPACITOR

(71) Applicant: KEMET Electronics Corporation, Simpsonville, SC (US)

(72) Inventors: Darius Toader, Gränna (SE); Victor Andoralov, Gränna (SE); Ralf Deisenhofer, Senden (DE)

(73) Assignee: KEMET Electronics Corporation, Forth Lauderdale, FL (US)

( * ) Notice: Subject to any disclaimer, the term of this patent is extended or adjusted under 35 U.S.C. 154(b) by 184 days.

(21) Appl. No.: 15/909,269

(22) Filed: Mar. 1, 2018

(65) Prior Publication Data
US 2018/0226204 A1    Aug. 9, 2018

Related U.S. Application Data

(63) Continuation-in-part of application No. 15/095,902, filed on Apr. 11, 2016, now Pat. No. 10,068,713.

(51) Int. Cl.
| | |
|---|---|
| *H01G 9/008* | (2006.01) |
| *H01G 9/15* | (2006.01) |
| *H01G 9/042* | (2006.01) |
| *H01G 9/028* | (2006.01) |
| *H01G 9/055* | (2006.01) |
| *H01G 11/48* | (2013.01) |
| *H01G 9/012* | (2006.01) |
| *H01G 9/04* | (2006.01) |

(52) U.S. Cl.
CPC ............. *H01G 9/008* (2013.01); *H01G 9/012* (2013.01); *H01G 9/028* (2013.01); *H01G 9/0425* (2013.01); *H01G 9/055* (2013.01); *H01G 9/151* (2013.01); *H01G 11/48* (2013.01); *H01G 2009/05* (2013.01)

(58) Field of Classification Search
CPC ............................... H01G 9/012; H01G 9/151
See application file for complete search history.

(56) References Cited

U.S. PATENT DOCUMENTS

| | | | |
|---|---|---|---|
| 4,203,877 A | 5/1980 | Baker | |
| 4,812,951 A | 3/1989 | Melody et al. | |
| 6,307,735 B1 | 10/2001 | Saito et al. | |
| 8,462,484 B2 | 6/2013 | Kakuma et al. | |
| 8,767,377 B2 | 7/2014 | Aoyama et al. | |
| 2001/0024352 A1 | 9/2001 | Kim et al. | |
| 2002/0117394 A1 | 8/2002 | Morokuma et al. | |

(Continued)

FOREIGN PATENT DOCUMENTS

| | | | |
|---|---|---|---|
| CN | 107680810 | 2/2018 | |
| DE | 3810937 A1 * | 10/1989 | ............. H01G 9/055 |

(Continued)

*Primary Examiner* — Eric W Thomas
(74) *Attorney, Agent, or Firm* — Joseph T. Guy; Patent Filing Specialist, Inc.

(57) ABSTRACT

An improved capacitor is described herein. The capacitor comprises a working element wherein the working element comprises an anode comprising a dielectric thereon and an anode conductive polymer layer on the dielectric. The capacitor also includes a cathode comprising a cathode conductive polymer layer and a conductive separator between the anode and said cathode. An anode lead is in electrical contact with the anode and a cathode lead is in electrical contact with the cathode.

35 Claims, 16 Drawing Sheets

(56) References Cited

U.S. PATENT DOCUMENTS

| | | |
|---|---|---|
| 2004/0223270 A1 | 11/2004 | Nitta et al. |
| 2007/0115611 A1* | 5/2007 | Fujimoto ............... H01G 11/52 |
| | | 361/508 |
| 2010/0020472 A1 | 1/2010 | Fujimoto et al. |
| 2011/0128675 A1 | 6/2011 | Merker et al. |
| 2012/0236465 A1 | 9/2012 | Kondo |
| 2013/0027847 A1* | 1/2013 | Aoyama ................. H01G 9/02 |
| | | 361/530 |
| 2013/0059064 A1 | 3/2013 | Ryo et al. |
| 2014/0071589 A1 | 3/2014 | Lin et al. |

FOREIGN PATENT DOCUMENTS

| | | |
|---|---|---|
| JP | 07283086 | 10/1995 |
| JP | 2009 289833 | 12/2009 |
| WO | WO 2017/180278 | 10/2017 |

* cited by examiner

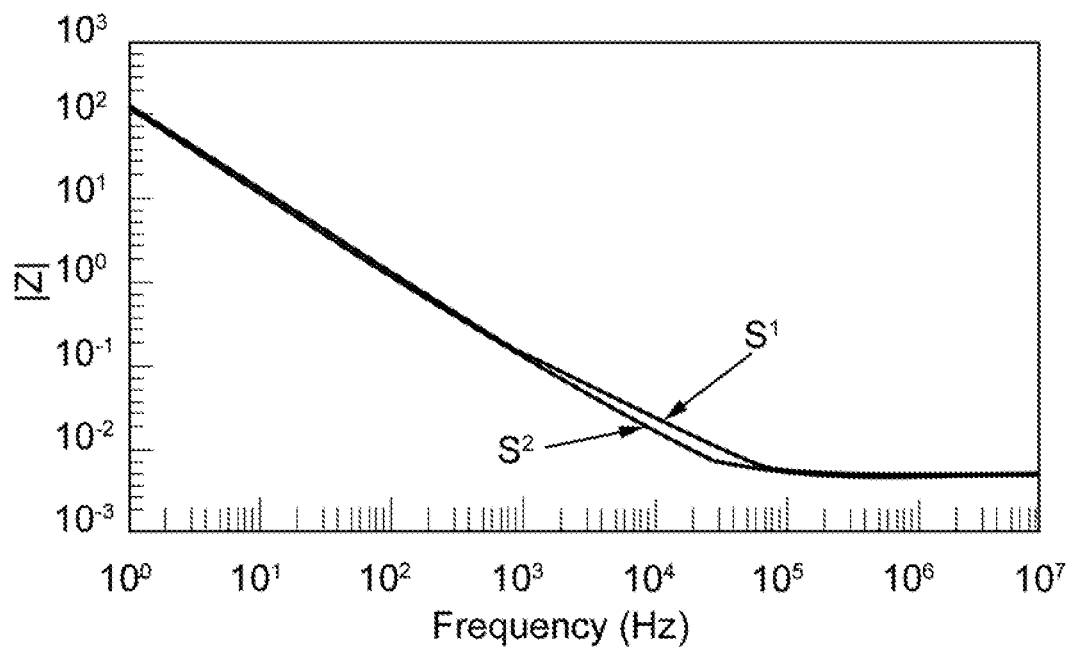
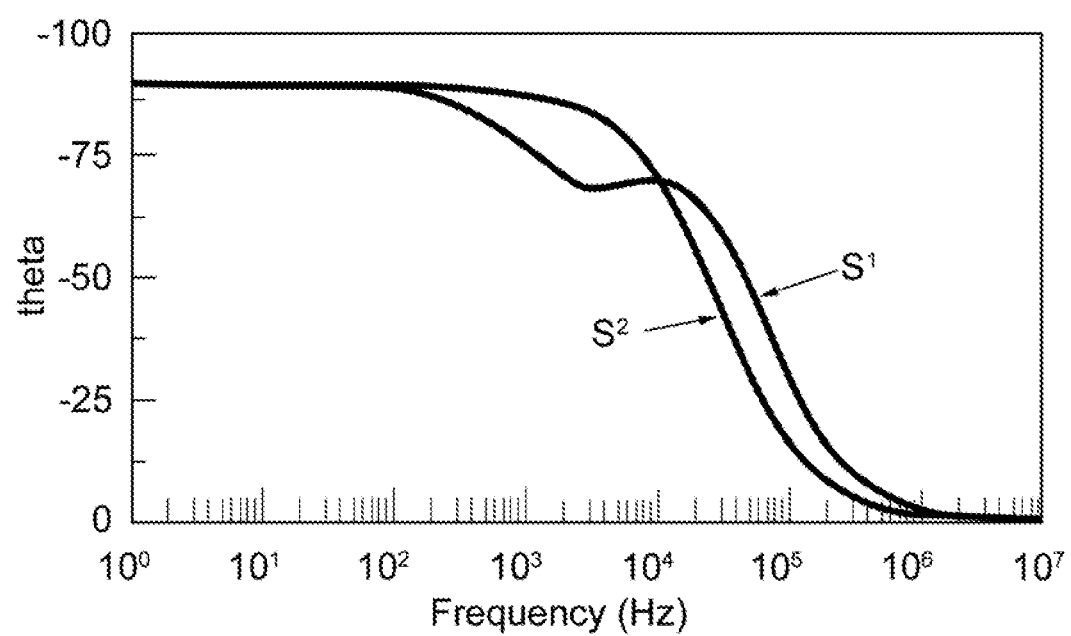
Fig. 16

HYBRID CAPACITOR AND METHOD OF MANUFACTURING A CAPACITOR

CROSS-REFERENCE TO RELATED APPLICATIONS

The present invention is a continuation-in-part application of pending U.S. patent application Ser. No. 15/095,902 filed Apr. 11, 2016 which is incorporated herein by reference.

BACKGROUND

The present invention is related to capacitors comprising a solid conductive polymeric electrolyte and an optional liquid electrolyte. More specifically, the present invention is related to a capacitor comprising a conductive separator and a method of forming the hybrid capacitor with improved conductive polymer coverage within the interstitial portions of a wound structure.

Capacitors have historically been defined within two general types with one type utilizing a liquid electrolyte and the other type utilizing a solid electrolyte. Liquid electrolyte capacitors, generally, comprise a layered structure typically as a winding with an anode conductor, a cathode conductor and an interleaved separator immersed in a liquid electrolyte all sealed within a container. Solid electrolyte capacitors, generally, include a conductive monolith or foil with a dielectric layer thereon and a solid cathode, such as conductive polymer or manganese dioxide, on the dielectric. Both general types of capacitor have experienced wide spread use in commerce and each has advantages, and disadvantages, not common to the other. For example, liquid electrolytic capacitors have a high capacitance but a poor Equivalent Series Resistance (ESR) due to poor conductivity of the electrolyte, typically not above about 0.015 S/cm, whereas conductive polymers have a high conductivity, up to 600 S/cm, and therefore capacitors utilizing conductive polymeric cathodes have a much lower ESR.

Conductive polymeric cathodes have seen wide spread use in commerce due, at least in part, to their low equivalent series resistance (ESR) and non-destructive failure mode. This has lead to a desire to form a hybrid capacitor wherein the conductive polymers commonly employed for solid electrolytic capacitors are utilized within the windings of a liquid electrolyte structure with the goal of achieving the high voltage common with liquid electrolyte capacitors while maintaining the lower ESR common with solid conductive polymeric electrolytes. U.S. Pat. Nos. 8,462,484 and 8,767,377 teach exemplary hybrid capacitors.

The formation of a hybrid capacitor has typically involved the formation of the interleaved wound structure; comprising anode, cathode and separator; followed by impregnation with the conductive polymer. The impregnation has been done by either in-situ polymerization of monomers or by diffusion of pre-formed polymer slurry into the interstitial areas of the wound interleaved structure.

In-situ polymerization of a monomer in the presence of an oxidizer was used to manufacture a first generation of hybrid capacitors. In-situ polymerization is a complex method with many problems including contamination of the final product by monomer and oxidizer and the work environment conditions are complex leading to poor process reliability. These issues were mitigated by the use of water based dispersions, or slurries, of pre-formed conductive polymer to impregnate the interstitial spaces of the capacitor winding.

Impregnation of a winding with preformed conductive polymer involves dipping the working element into a solution comprising conductive polymer or adding the solution onto the working element wherein the conductive polymer migrates, or diffuses, into the interstitial spaces. Manufacturing stages are complicated due to limitations associated with the rate and efficiency of diffusion through the working element. Filtration of polymeric particles and counterions by the separator limits effective diffusion thereby limiting the length of the working element. As a result, only small capacitor sizes have been successfully achieved. Large capacitors have proven difficult to make. In fact, the maximum case size widely available commercially is about 10 mm in diameter and about 12.5 mm in length with a maximum capacitance of about 22 pF (at rated voltage 63V) and the lowest ESR achieved is about 16 ma.

Due to manufacturing limitations, hybrid capacitors have been primarily radial capacitors as the manufacturing process is not suitable for small axial capacitors. With axial capacitors the bottom tab, or lead, will necessarily be dipped in the polymer precursor or polymer slurry thereby resulting in a polymer coated tab which causes problems with subsequent processing. Furthermore, it is virtually impossible to apply voltage across the capacitor, such as to form polymer in-situ or to heal damaged sites, since the bottom tab will be in the solution.

In spite of the ongoing efforts, those of skill in the art still do not have a suitable method for forming a hybrid capacitor, and a hybrid capacitor formed thereby, suitable for large case sizes or suitable for use in manufacturing axial capacitors. The present invention provides a method for making a hybrid capacitor which is not size dependent and which exhibits improved quality and reproducibility.

SUMMARY OF THE INVENTION

It is an object of the invention to provide an improved method for forming a hybrid capacitor and an improved capacitor formed by the improved method.

It is an object of the invention to provide a method for making an axial hybrid capacitor and an axial hybrid capacitor.

A particular feature of the invention is the ability to provide a hybrid capacitor without limit to capacitor size, configuration or shape.

These and other advantages, as will be realized, are provided in a capacitor. The capacitor comprises a working element wherein the working element comprises an anode comprising a dielectric thereon and an anode conductive polymer layer on the dielectric. The capacitor also includes a cathode comprising a cathode conductive polymer layer and a conductive separator between the anode and cathode. An anode lead is in electrical contact with the anode and a cathode lead is in electrical contact with the cathode.

Yet another embodiment is provided in an axial wound capacitor comprising a working element wherein the working element comprises an anode comprising a dielectric thereon, a cathode; and a conductive separator between the anode and cathode. An anode lead is in electrical contact with the anode and a cathode lead is in electrical contact with the cathode.

Yet another embodiment is provided in a method for forming a capacitor. The method includes:
forming an anode layer comprising an anode, a dielectric on the anode and an anode conductive polymer on the dielectric;
forming a cathode layer comprising a cathode and a cathode conductive polymer on the cathode;
forming a conductive separator; and forming a working element comprising winding the anode layer and the cathode layer with the conductive separator between the anode layer and cathode layer wherein the working element has an anode lead in electrical contact with the anode and a cathode lead in electrical contact with the cathode.

Yet another embodiment is provided in a method for forming a capacitor. The method includes:
forming an anode layer;
forming a cathode layer;
forming a conductive separator comprising a conductive polymer coated on a material or impregnating the material; and
forming a working element comprising winding the anode layer and the cathode layer with the conductive separator between the anode layer and cathode layer wherein the working element has an anode lead in electrical contact with an anode of the anode layer and a cathode lead in electrical contact with a cathode of the cathode layer.

Yet another embodiment is provided in a capacitor comprising:
a working element comprising an asymmetrical anode comprising a first dielectric on a first side and a second dielectric on a second side. An anode conductive polymer layer is on the first dielectric. A cathode is provided wherein the cathode preferably comprises a cathode conductive polymer layer. A separator is between the anode conductive polymer layer and cathode. An anode lead is in electrical contact with the anode and a cathode lead is in electrical contact with the cathode.

A method for forming a capacitor comprising:
forming an asymmetrical anode layer comprising an anode, a first dielectric on a first side of the anode a second dielectric on a second side of the anode and an anode conductive polymer on the first dielectric;
forming a cathode layer comprising a cathode;
forming a separator; and
forming a working element comprising winding the anode layer and cathode layer with conductive separator between the anode layer and cathode layer wherein the working element has an anode lead in electrical contact with the anode and a cathode lead in electrical contact with the cathode.

Yet another embodiment is provided in a method for forming a capacitor comprising:
forming an asymmetric anode layer comprising a conductive polymer layer on a first dielectric of the asymmetric anode layer;
forming a cathode layer;
forming a conductive separator comprising a conductive polymer coated on a material or impregnating the material; and
forming a working element comprising winding the asymmetric anode layer and cathode layer with the conductive separator between the conductive polymer layer and cathode layer wherein the working element has an anode lead in electrical contact with an anode of the anode layer and a cathode lead in electrical contact with a cathode of the cathode layer.

FIGURES

Figure 14:
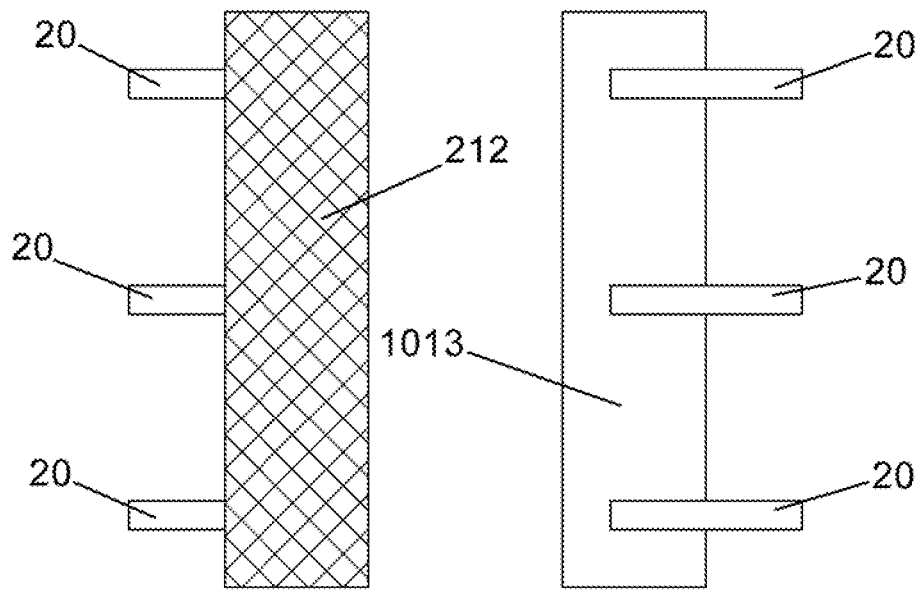
Figure 15:
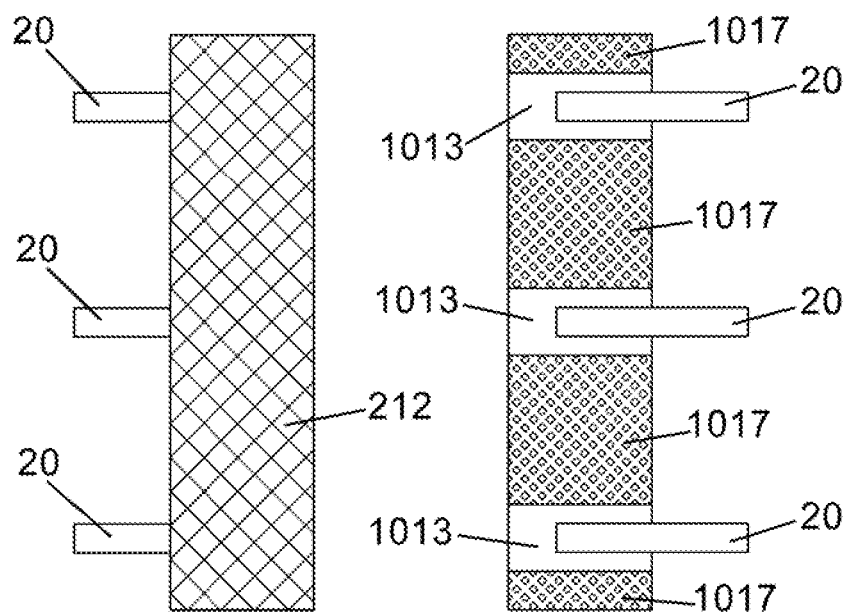

FIGS. 14 and 15 schematically illustrate opposite sides of an asymmetrical anode of the invention.

Figure 17:
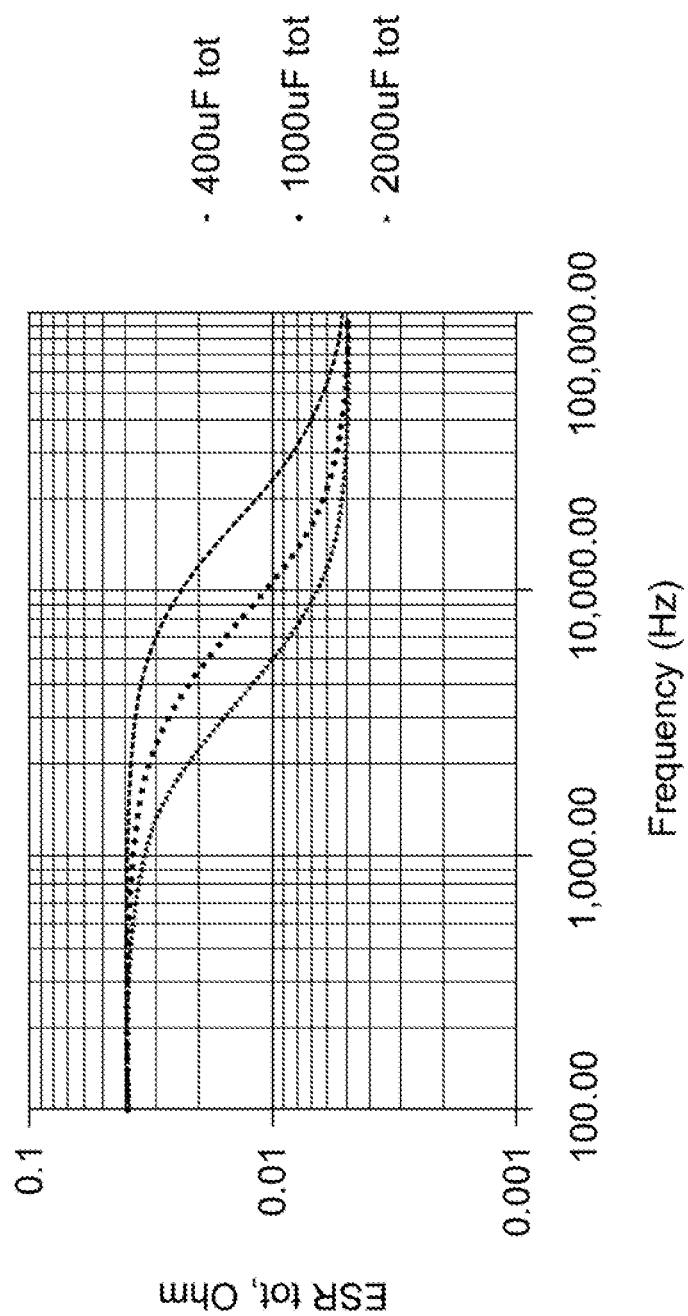
Figure 18:
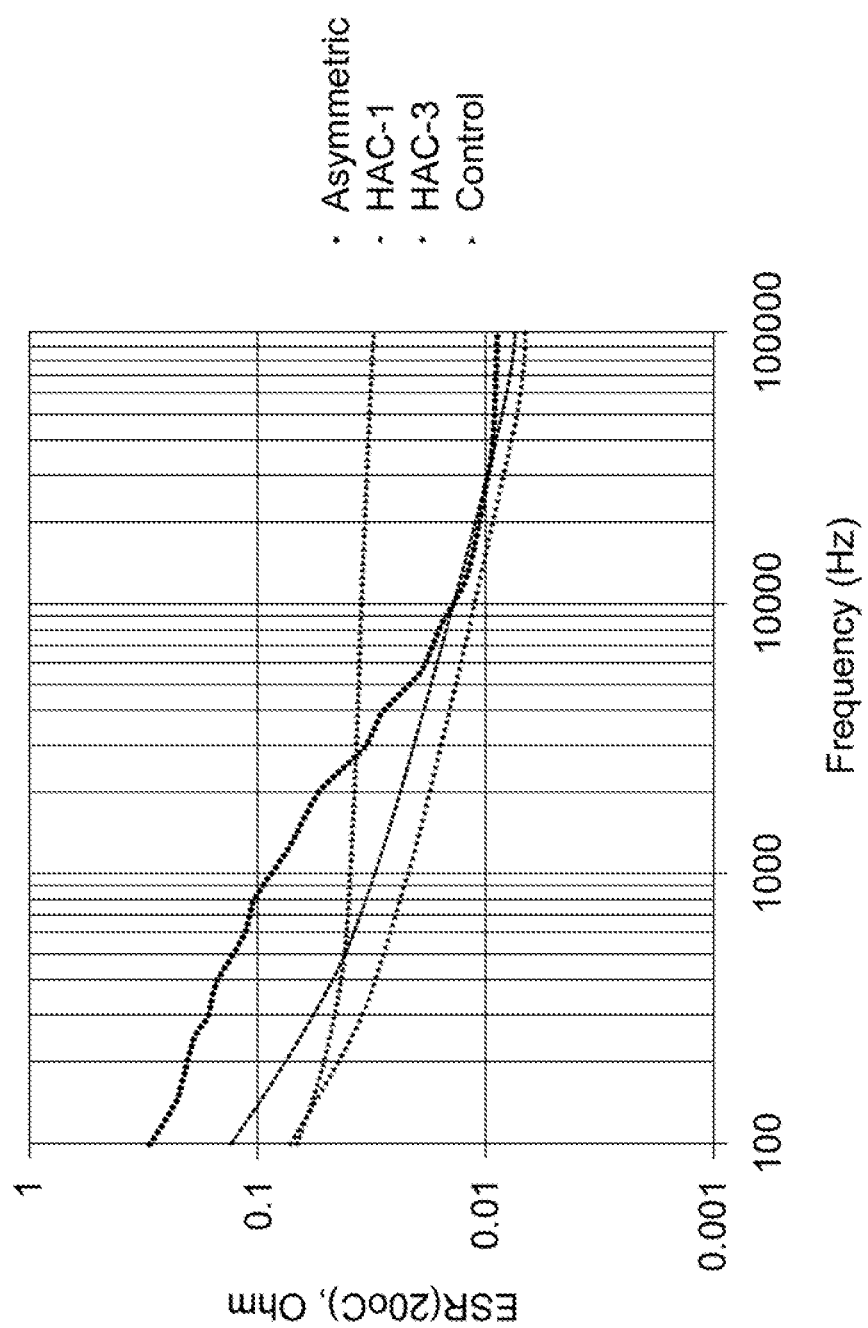

FIGS. 16-18 graphically illustrate embodiments of the invention.

Figure 19:
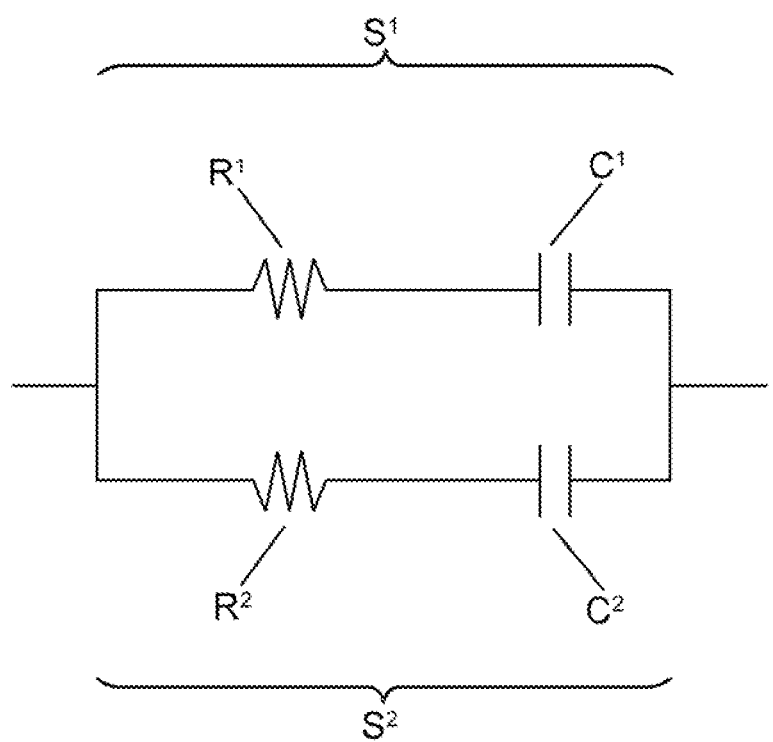

FIG. 19 is an electrical schematic diagram of an embodiment of the invention.

Figure 20:
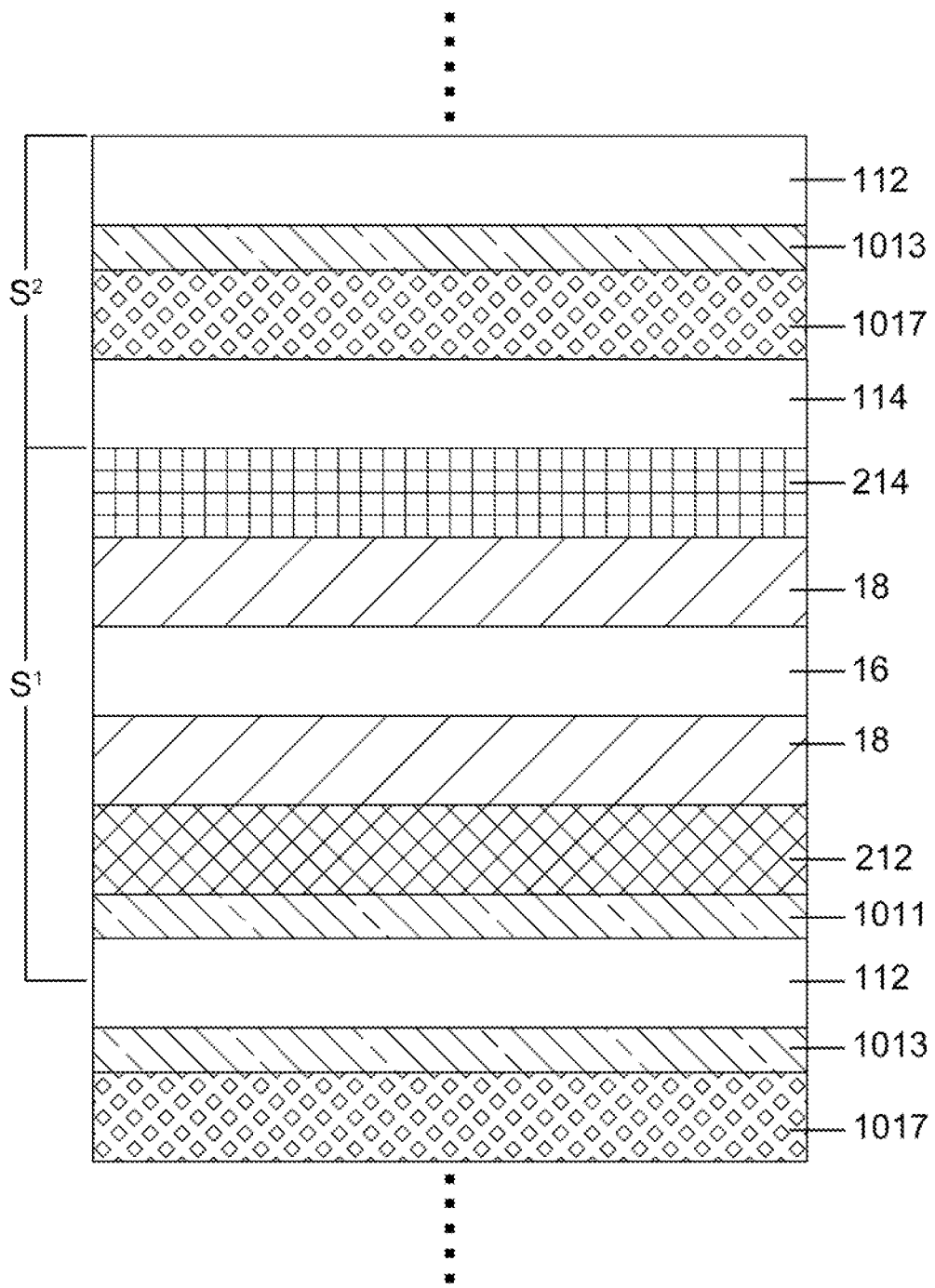

FIG. 20 is a schematic cross-sectional view of an embodiment of the invention.

Figure 21:
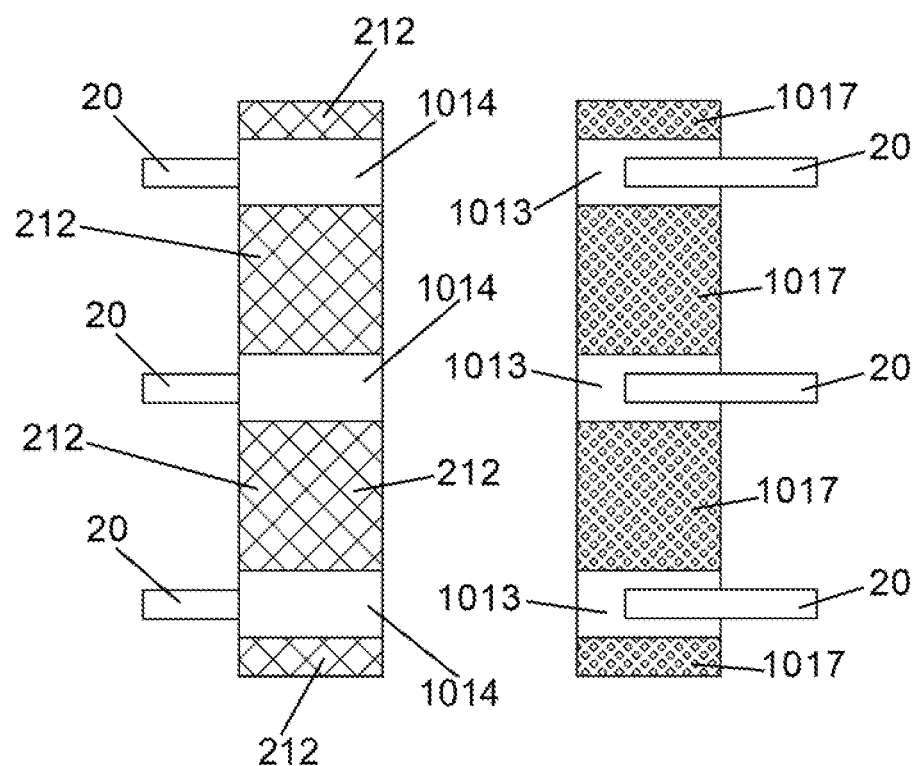

FIG. 21 is a schematic illustration of an embodiment of the invention.

DESCRIPTION

The instant invention is specific to a capacitor, comprising a solid conductive polymer electrolyte and an optional liquid electrolyte interspersed in a wound capacitor comprising interleaved anode, cathode and optionally a separator. More specifically, the present invention is directed to a capacitor, and a method of making a capacitor, which is not limited in size, exhibits improved quality and is suitable for manufacturing axial capacitors. More specifically, the instant invention allows for the manufacture of capacitors with enhanced performance, specifically low ESR and high capacitance, without limit to case size and in virtually any design including axial, radial, planar, etc.

An element of the instant invention is the utilization of anodes, cathodes and separators which are pre-treated with conductive polymer either as a coating or, particularly in the case of the separator, being impregnated with conductive polymer. The pre-treatment with conductive polymer is done before the working element is formed thereby allowing for an improved polymer layer relative to the prior art. Since the method is not limited to polymer diffusion into the windings the instant method eliminates capacitor size restrictions and significantly increases volumetric efficiency defined as capacitance as a function of capacitor size.

The problem associated with solid electrolyte distribution over the entire electrode surface is eliminated by the formation of a conductive porous layer prior to winding thereby providing a conductor between the anode conductive polymer coating and cathode conductive polymer coating whereby conventional liquid electrolyte can flow through the conductive porous layer to provide typical functions thereof such as self-healing. As the conductive polymeric layers are formed prior to winding the only impregnation necessary after winding is the liquid electrolyte which is more mobile and can more easily diffuse, or migrate, into the interstitial area. This allows for a wide variety of designs since the liquid electrolyte is not impeded from migrating into even the most remote interstitial spaces. Furthermore, the prior problem of conductivity break, essentially an incomplete electrical conductive pathway, between polymer coated electrodes common with the art is mitigated by substituting the typical non-conductive separator with a conductive porous layer between the anode conductive polymer coating and cathode conductive polymer coating.

The invention will be described with reference to the various figures forming an integral non-limiting component of the disclosure. Throughout the disclosure similar elements will be numbered accordingly.

Figure 1:
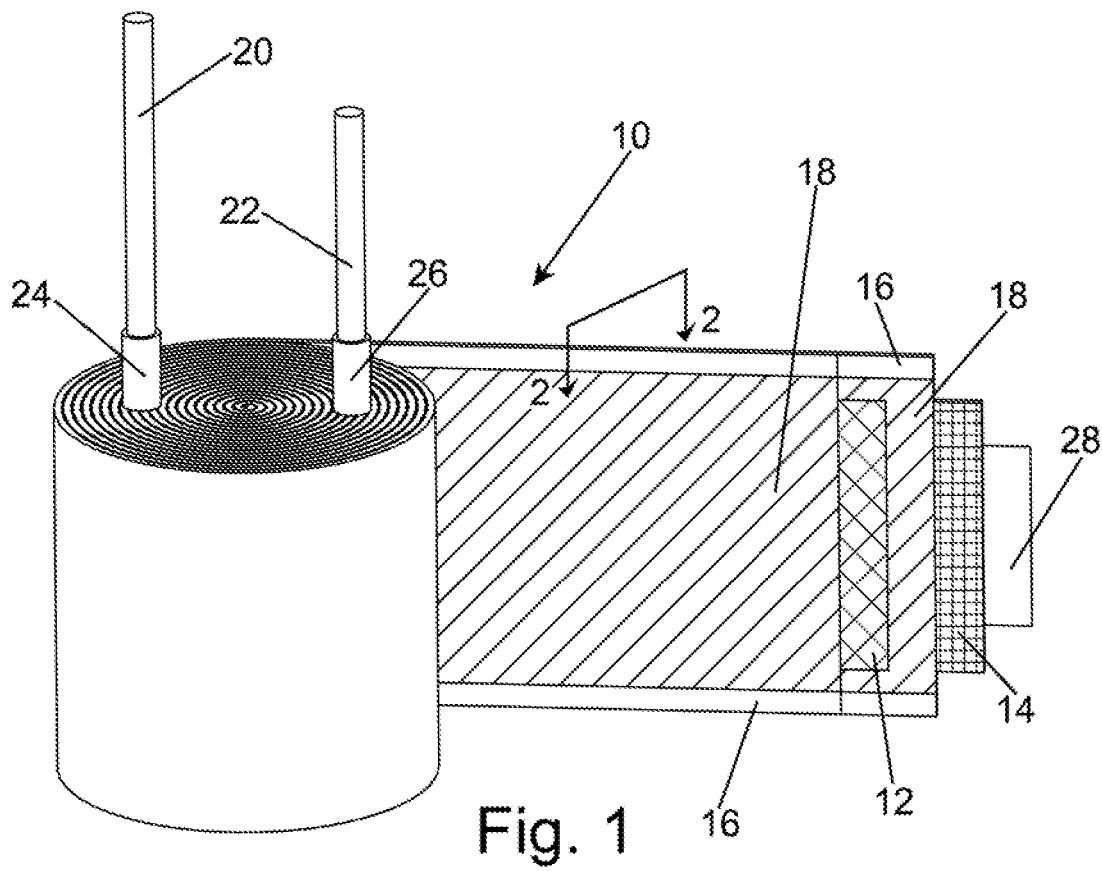
FIG. 1 is a partially unwound schematic perspective view of an embodiment of the invention.

An embodiment of the invention will be described with reference to FIG. 1 wherein a working element is shown in schematic partially unwound view prior to insertion into a container and impregnation with liquid electrolyte. In FIG. 1, the working element, generally represented at 10, comprises a conductive coated anode, 12, comprising conductive polymer on at least a portion of one side, and conductive coated cathode, 14, with a conductive separator, 16, there between. The conductive separator has conductive polymer, 18, either coated on the separator or the separator is impregnated, and preferably saturated, with conductive polymer. The conductive coated anode, 12, and conductive coated cathode, 14, each have conductive polymer layers there on as will be more full described herein. An anode lead, 20, and cathode lead, 22, extend from the wound capacitor and ultimately form the electrical connectivity to a circuit. It would be understood from the description that the anode lead is in electrical contact with the anode and the cathode lead is in electrical contact with the cathode and electrically isolated from the anode or anode lead. Tabs, 24 and 26, are commonly employed to electrically connect the anode lead to the anode and the cathode lead to the cathode as known in the art. A closure, 28, such as an adhesive tape inhibits the working element from unwinding during handling and assembly after which the closure has little duty even though it is part of the finished capacitor.

Figure 2:
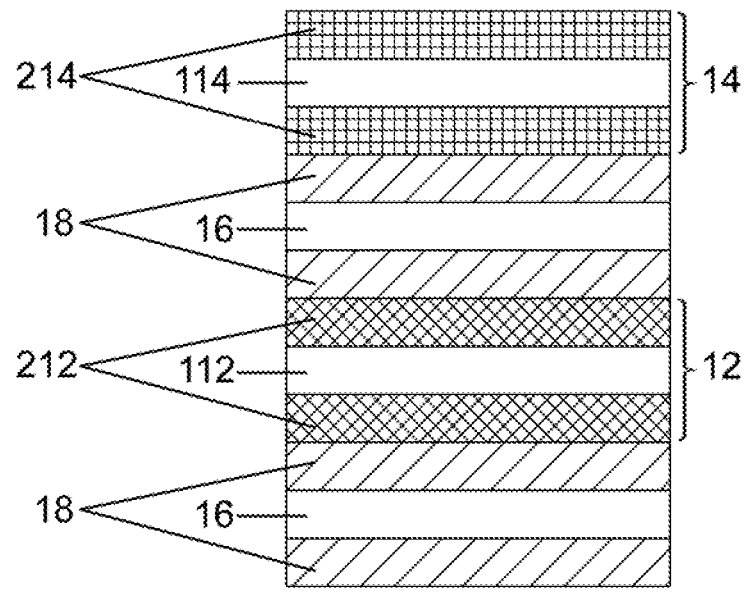
FIG. 2 is a cross-sectional view taken along line 2-2 of FIG. 1.

A cross-sectional view, taken along line 2-2 of FIG. 1, is illustrated schematically in FIG. 2. In FIG. 2, the separator, 16, is shown with conductive polymer, 18, on either side thereof for the purposes of illustration with the understanding that the separator may be impregnated, and preferably saturated, with conductive polymer such that the dimension of the separator is not appreciably altered by the inclusion of conductive polymer. The conductive coated anode, 12, illustrated as a symmetrical anode comprises an anode foil, 112, with an anode conductive polymer layer, 212, on each side thereof. The conductive coated cathode, 14, comprises a cathode foil, 114, with a cathode conductive polymer layer, 214, on at least one side thereof. The separator is preferably porous thereby allowing liquid electrolyte to pass there through. Once the working element is formed and inserted into a housing liquid electrolyte fills any void or vacancy between the anode conductive polymer layer, 212, and the cathode conductive polymer layer, 214. The separator is preferably porous with liquid electrolyte moving freely through the separator.

While the cathode is illustrated herein as having a conductive polymer coating the invention is not limited thereto. The cathode layer can comprise a conductive carbon layer or a metallic layer and in some embodiments it is preferred that the cathode not comprise a conductive polymer layer. In a preferred embodiment the cathode layer and anode layer are the same for manufacturing conveniences.

The adjacent conductive polymer layers are, in one embodiment, in physical contact but not otherwise fused, cross-linked, or laminated to each other. Disassembly of layers in physical contact would result in a clean separation of adjacent layers of conductive polymer. In an alternative embodiment adjacent conductive polymer layers are intimate represented by being fused, cross-linked, or laminated to each other thereby mimicking a continuous conductive polymer layer. Disassembly of intimate layers would result in dissociation of the conductive polymer layer from one side or the other and conductive polymer layer destruction.

Figure 3:
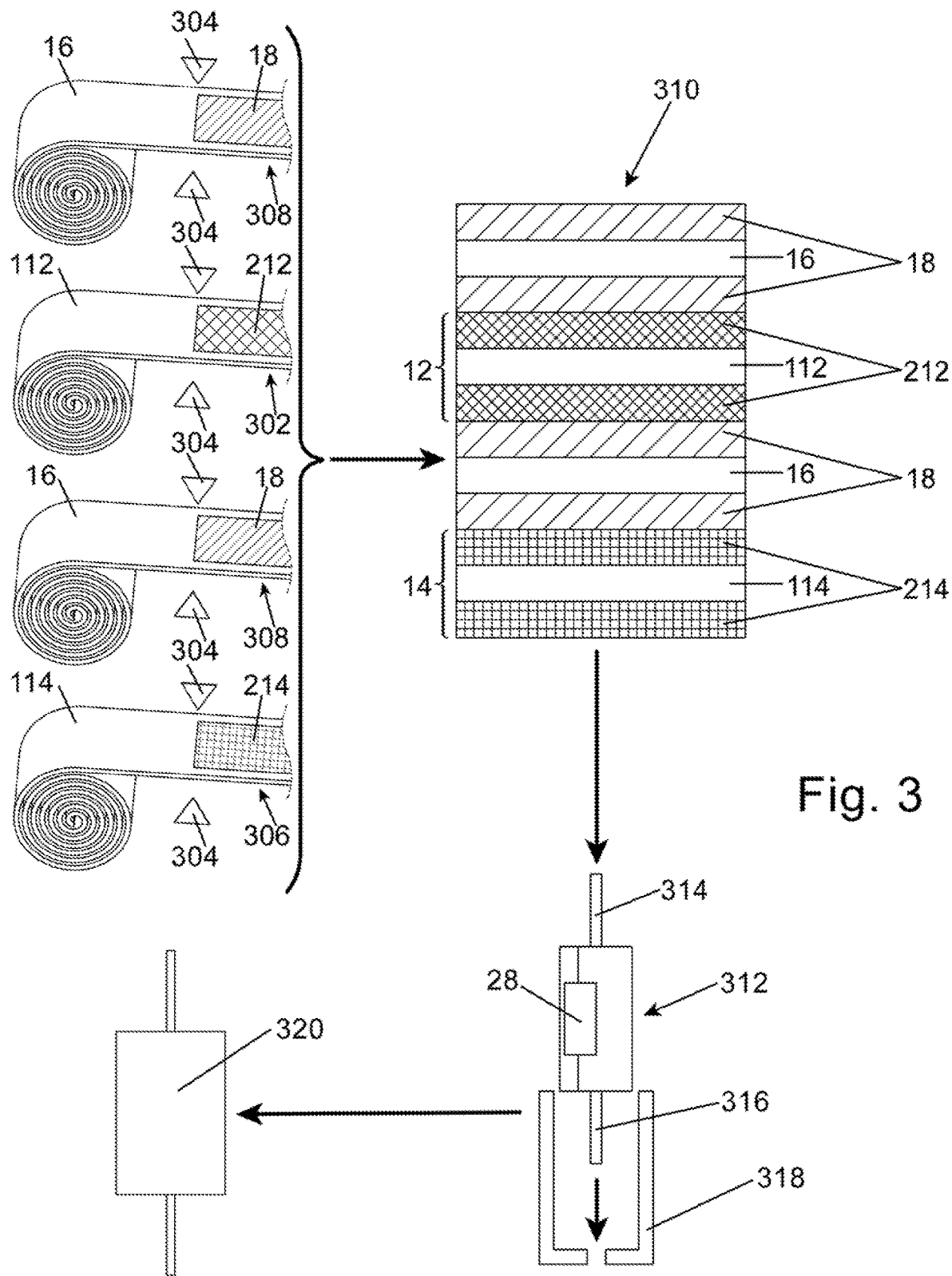
FIG. 3 is a schematic representation of an embodiment of the invention.

An embodiment of the invention will be described with reference to FIG. 3. In FIG. 3, a series of layers are prepared including an anode layer, at 302, wherein an anode foil, 112, is treated to form a dielectric on the surface of the anode foil and then a conductive polymer layer, 212, is formed on the dielectric on at least a portion of one side by a conductive polymer application process, 304. The conductive polymer application process occurs on the dielectric on at least a portion of one side of the anode foil and for a symmetrical anode on both sides of the anode foil, in simultaneous or sequential coating steps. If a cathode comprising a conductive polymer layer is employed the cathode layer is formed, at 306, wherein a conductive polymer layer, 214, is formed on the cathode, 114, by a conductive polymer application process, 304, which may be the same process as used for the anode conductive polymer layer or a different process. If a cathode layer is used which does not comprise a conductive polymer an appropriate roll of material is provided and the polymer formation process for the cathode layer is not necessary. A separator layer is formed, at 306, wherein an impregnated area of conductive polymer, 18, is formed by a conductive polymer application process, 304, which may be the same process as the anode and cathode layer formation or a different process. The conductive polymer is formed as a layer on the cathode and anode and may be a layer or an impregnated material for the separator. A layered structure, 310, as described relative to FIG. 2, is formed by interleaving the layers. The layered structure is slit, an anode tab, 314, is electrically connected to the anode and a cathode tab, 316, is electrically connected to the cathode resulting in a tabbed working element, 312, preferably with a closure, 28, securing the working element to inhibit unwinding. Leads, not shown, are preferably attached to the tab, or the tab functions as a lead, or electrically connects to a component of a housing such as a conductive, preferably metallic, can or conductive, preferably metallic, lid which functions as a lead, thereby providing a leaded working element. For the purposes of this illustration an axial arrangement is illustrated without limit thereto. The leaded working element is placed in a housing, 318, thereby forming a housed leaded working element. The housed leaded working element is optionally impregnated with working electrolyte which is preferably a liquid at operating temperatures. The housing is sealed and the capacitor is aged to provide a finished capacitor, 320.

Figure 12:
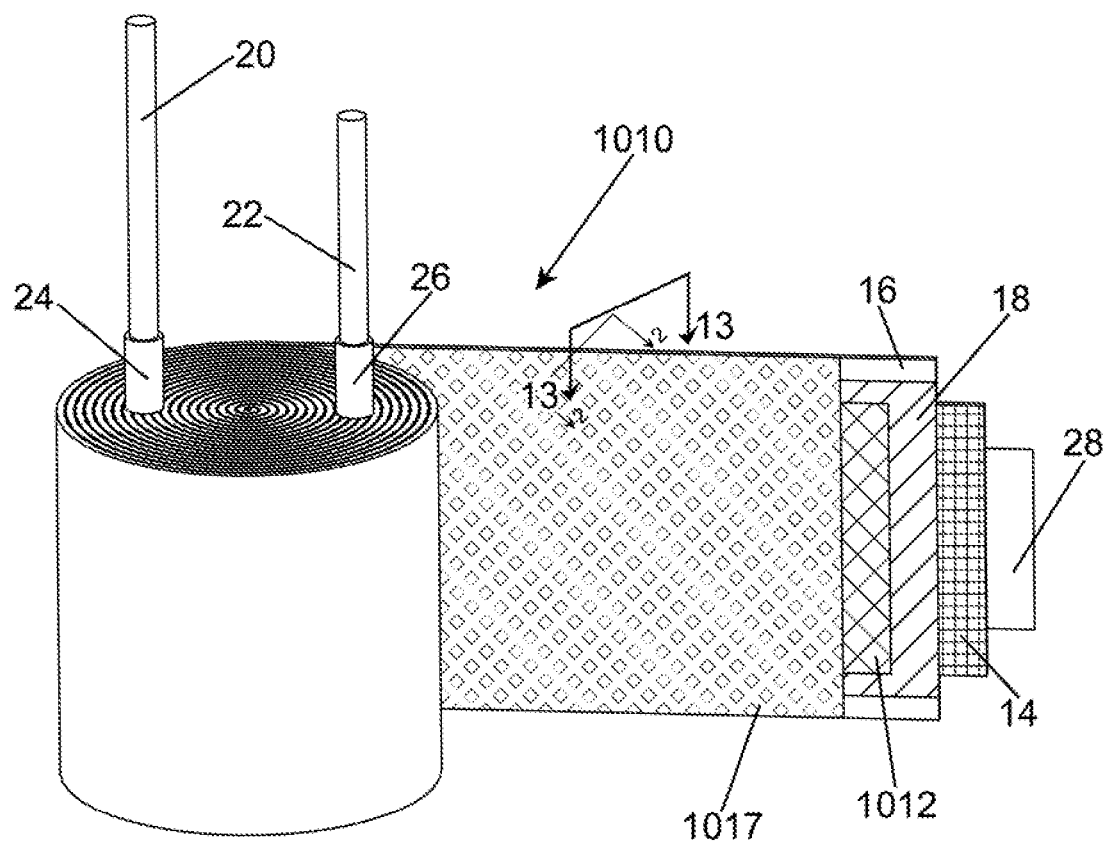
FIG. 12 is a partially unwound schematic perspective view of an embodiment of the invention.
Figure 13:
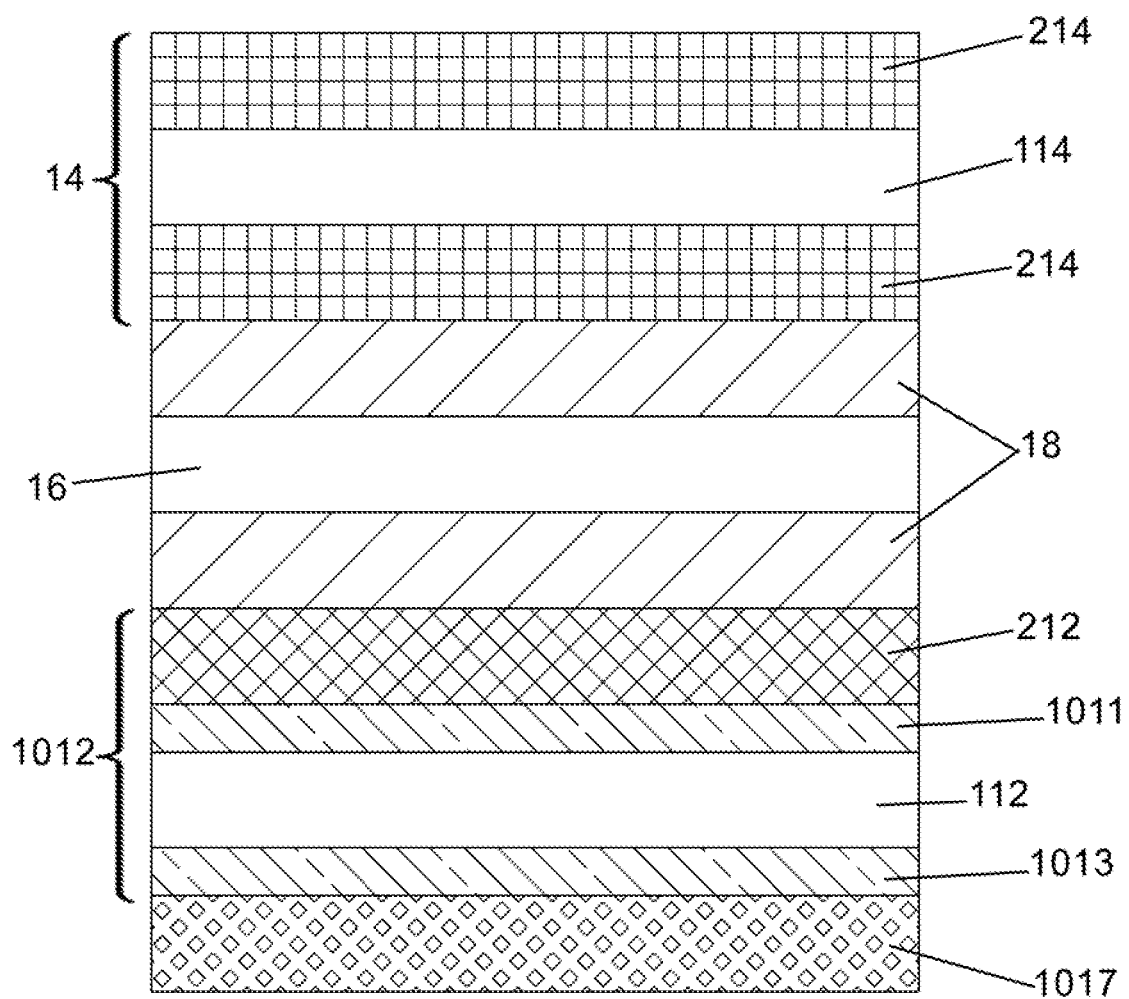
FIG. 13 is a cross-sectional view taken along line 13-13 of FIG. 12.

An embodiment of the invention will be described with reference to FIGS. 12 and 13. In FIG. 12 a working element is shown in schematic partial unwound view and in FIG. 13 a schematic cross-section is shown as taken alone line 13-13 in FIG. 12. The working element, generally represented at 1010, comprises an asymmetrical anode layer, 1012, wherein the anode layer comprises a first dielectric, 1011, on a first side and a second dielectric, 1013, on a second side. The first and second dielectric are preferably the same in some embodiments, for manufacturing conveniences, however, the first and second dielectric can be different to obtain different properties. The first dielectric is coated, and at least partially covered, with conductive polymer, 212. The conductive cathode layer, 14, and conductive separator can be as described with reference to FIG. 1. A non-conductive separator, 1017, is between the second dielectric and adjacent cathode layer. The non-conductive separator may be void of any conductive polymer thereon or therein. In an embodiment a conductive separator as described elsewhere herein can be utilized adjacent the second dielectric thereby minimizing the number of components necessary in the manufacturing process, however, this is not a preferred embodiment due to cost considerations.

An embodiment of an asymmetrical anode layer, 1012, is illustrated in schematic view in FIG. 14 wherein the entire second dielectric, which is preferably on the same side as the attachment of the anode lead, 20, is exposed without conductive polymer layer thereon. In a preferred embodiment the asymmetrical anode layer forms, on one side, a capacitive couple comprising conductive polymer between the dielectric of the anode and the cathode layer. The opposite side, comprising the second dielectric which does not comprise polymer, has liquid electrolyte and a non-conductive separator between the second dielectric and cathode thereby forming a conventional capacitive couple utilizing a liquid electrolyte thereby forming a capacitor comprising parallel functionality.

For the purposes of the present invention an asymmetrical anode is defined as an anode having less of the surface area on one side coated by conductive polymer than the amount of surface area on the opposite side coated by conductive polymer.

An embodiment of an asymmetrical capacitor comprising an asymmetrical anode is illustrated schematically in FIG. 20. In FIG. 20, an anode, 112, is illustrated schematically comprising a first dielectric, 1011 and second dielectric, 1013. The first dielectric has coated thereon a layer of conductive polymer, 212. A conductive separator, 16, comprising conductive polymer, 18, as detailed herein is adjacent the conductive polymer layer, 212. A cathode layer, 114, with an optional first layer of conductive polymer, 214, is adjacent the conductive separator thereby forming a first circuit, $S^1$, having a first resistance and first capacitance. The second dielectric, 1013, of the anode is separated from the cathode by a non-conductive insulator, 1017, thereby forming a second circuit, $S^2$, having a second resistant and second capacitance. The capacitor illustrated in FIG. 20 would have an electrical schematic diagram is illustrated in FIG. 19 wherein the resistance and capacitance of the first capacitive couple, comprising a conductive polymer there between, illustrated as $S^1$, has a first resistance, $R^1$, and a first capacitance, $C^1$. The second capacitive couple, with no conductive polymer there between, illustrated as $S^2$, has a second resistance, $R^2$, and a second capacitance, $C^2$.

A hybrid capacitor with a symmetrical anode has single capacitance with each capacitive couple having an anode and cathode with the combination of a conductive polymer and liquid dielectric there between. With an asymmetrical anode, as illustrated in FIG. 20, the total capacitance of the capacitor is represented by two parallel capacitive couples with one being the same capacitive couple as the symmetrical anode and the other being the capacitive couple formed by an anode, cathode and a non-conductive separator impregnated with an electrolyte, without a full layer, and preferably no layer, of conductive polymer there between. Each capacitive couple, with the asymmetrical anode, has two ESR's with one being the ESR for the capacitive couple having the conductive polymer between the anode and cathode, referred to herein as the polymeric capacitive couple, and the other having less than a complete layer of, or no, conductive polymer between the anode and cathode referred to as the electrolytic capacitive couple.

FIG. 16 illustrates graphically the impedance |Z| of the polymeric capacitive couple, $S^2$, versus the electrolytic capacitive couple, $S^1$, as a function of frequency (Hz) wherein the polymeric capacitive couple has an ESR of about 5 mOhm and the electrolytic capacitive couple, with no conductive polymer layer on the second dielectric, has an ESR of 150 mOhm with both having a total capacitance of about 1000 μF.

FIG. 17 illustrates graphically the frequency dependency of fully asymmetrical capacitor, as illustrated in FIG. 20, with an ESR for the polymeric capacitive couple of about 5 mOhm and an ESR for the electrolytic capacitive couple of about 150 mOhm wherein the capacitor is formulated to a capacitance of 400 μF, 1000 μF and 2000 μF. If capacitance is significant the ESR shift occurs at lower frequencies. For high frequency applications the capacitor can demonstrate enhanced ripple current capability.

FIG. 15 schematically represents a partially asymmetric anode layer, at least that portion of the second dielectric in the vicinity of the anode lead is exposed without conductive polymer layer thereon. At least a portion of the second dielectric is not coated by conductive polymer and preferably at least 25% to no more than 99% of the area of the second dielectric is covered. That portion which is not covered in conductive polymer is preferably devoted to an area of attachment for the tabs. In FIG. 21 both the first dielectric and second dielectric are incompletely covered by conductive polymer. At least 25% to no more than 99% of the area of each dielectric is covered. That portion which is not covered in conductive polymer is preferably dedicated to an area of attachment for the tabs and this area is often degraded on both sides by tab attachment.

The cathode foil, separators and anode foil are typically provided as a wide roll and slit to size. The anode foil is preferably etched and a dielectric is formed thereon. The dielectric may be formed prior to slitting in which case a subsequent step is desirable to form dielectric on the slit edge prior to application of the conductive polymer coating. The cathode, separator and anode may be treated with a coupling agent, to improve adhesion between the surface and conductive polymer layer, or to impart other specific surface behaviors. The cathode, separator and anode may be washed and dried before or after conductive polymer layer formation or impregnation and the conductive polymer layer formation or impregnation step may be repeated several times if required. Electrical leads, or tabs, are typically electrically connected to the anode and cathode, preferably prior to cutting to length and the leads may be treated with masking material to protect them from farther modification and to keep them ready for welding to capacitor terminals.

The conductive polymer may be applied to the cathode, anode or separator by any suitable method including immersion, coating, and spraying. In immersion the cathode, anode or separator is pulled through a bath or vessel with a conductive polymer dispersion therein wherein the dispersion comprises at least about 1 wt % conductive polymer to no more than about 10 wt % conductive polymer. Immersion is preferred for the separator. Coating and spraying may be done with any printing technique including screen printing or spraying of a dispersion of conductive polymer onto the surface of cathode foil, anode foil, or separator. Coating or spraying is preferable for the cathode and anode. It is preferable that the conductive polymer coating be applied to the anode, cathode or separator at an amount of at least 0.1 mg/cm². Below about 0.1 mg/cm² the coating weight is insufficient for adequate conduction and incomplete coating may result. It is preferable that the conductive polymer coating be applied in an amount sufficient to achieve a coating weight of no more than about 10 mg/cm². Above about 10 mg/cm² the added coating thickness does not appreciably increase the conductivity.

Figure 4:
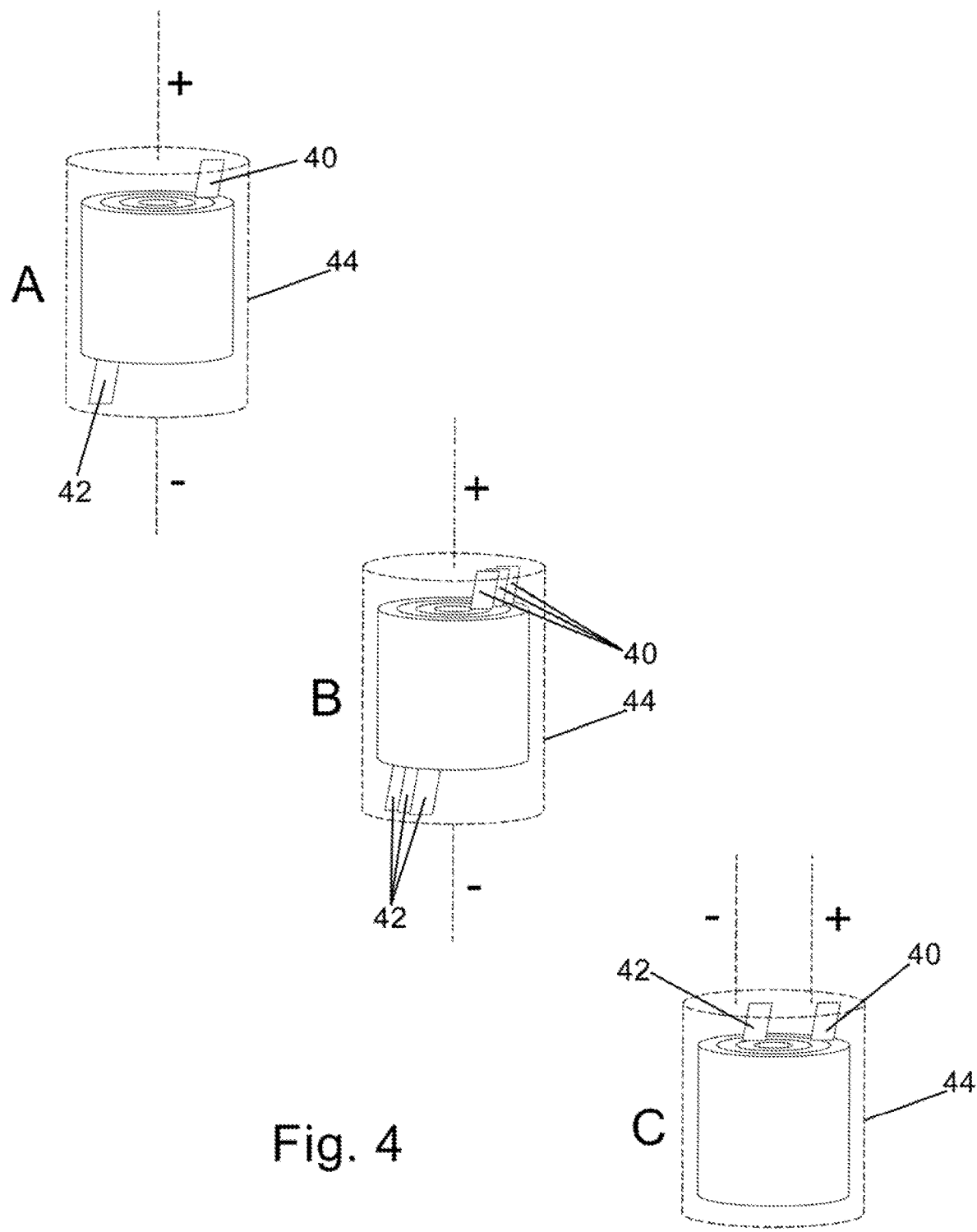
FIG. 4 is a schematic representation of an embodiment of the invention.

An axial capacitor is a particularly preferred embodiment. An axial capacitor has an anode terminal on one face of the capacitor and a cathode terminal on the opposite face. Wound axial capacitors, incorporating conductive polymer electrolytes, have been considered unavailable due to the issues related with polymer impregnation wherein the lower tab or lead is necessarily immersed in the conductive polymer, or precursors, leading to detrimental deposition of conductive polymer thereon. A particular advantage with axial capacitors is the ability to utilize multiple tabs and leads particularly as the length of the anode and cathode increase as is now available with the instant invention. Longer foil lengths lead to a higher percentage of foil resistance culminating in a higher ESR. Multi-tab or multi-leads minimizes the foil resistance effect. With a single lead the current must flow from the furthest extent of the foil to the tab and lead which is detrimental to ESR. It is preferable to utilize multiple anode leads and multiple cathode leads thereby decreasing the conductive path length. Various capacitor configurations will be described with reference to FIG. 4 wherein the capacitors are illustrated schematically in partial shadow view thereby allowing the components to be visualized. In FIG. 4, a single tab axial capacitor is illustrated at A, a multiple tab axial capacitor is illustrated at B and a radial capacitor is illustrated at C. An axial capacitor has anode leads, 40, and cathode leads, 42, extending from opposing sides of the working element, 44, whereas a radial capacitor has anode leads and cathode leads extending from a common side. FIG. 4B illustrates multiple anode tabs, 40, and multiple cathode tabs, 42, extending from the working element wherein each tab is in electrical contact with the anode at a different location. For example, FIG. 4B is illustrated with three tabs, without limit thereto, wherein the tabs are preferably equally spaced along the length of the anode thereby minimizing the length of the conduction path. Similarly, FIG. 4B is illustrated with three cathode leads which are preferably equally spaced along the length of the cathode. Multiple leads are possible with radial capacitors but it has previously been unsuitable for use with hybrid capacitors since the limitation of a small size made the use of multiple leads on a common face difficult to manufacture. Even with a large size single leads are preferable with radial capacitors.

Figure 11:
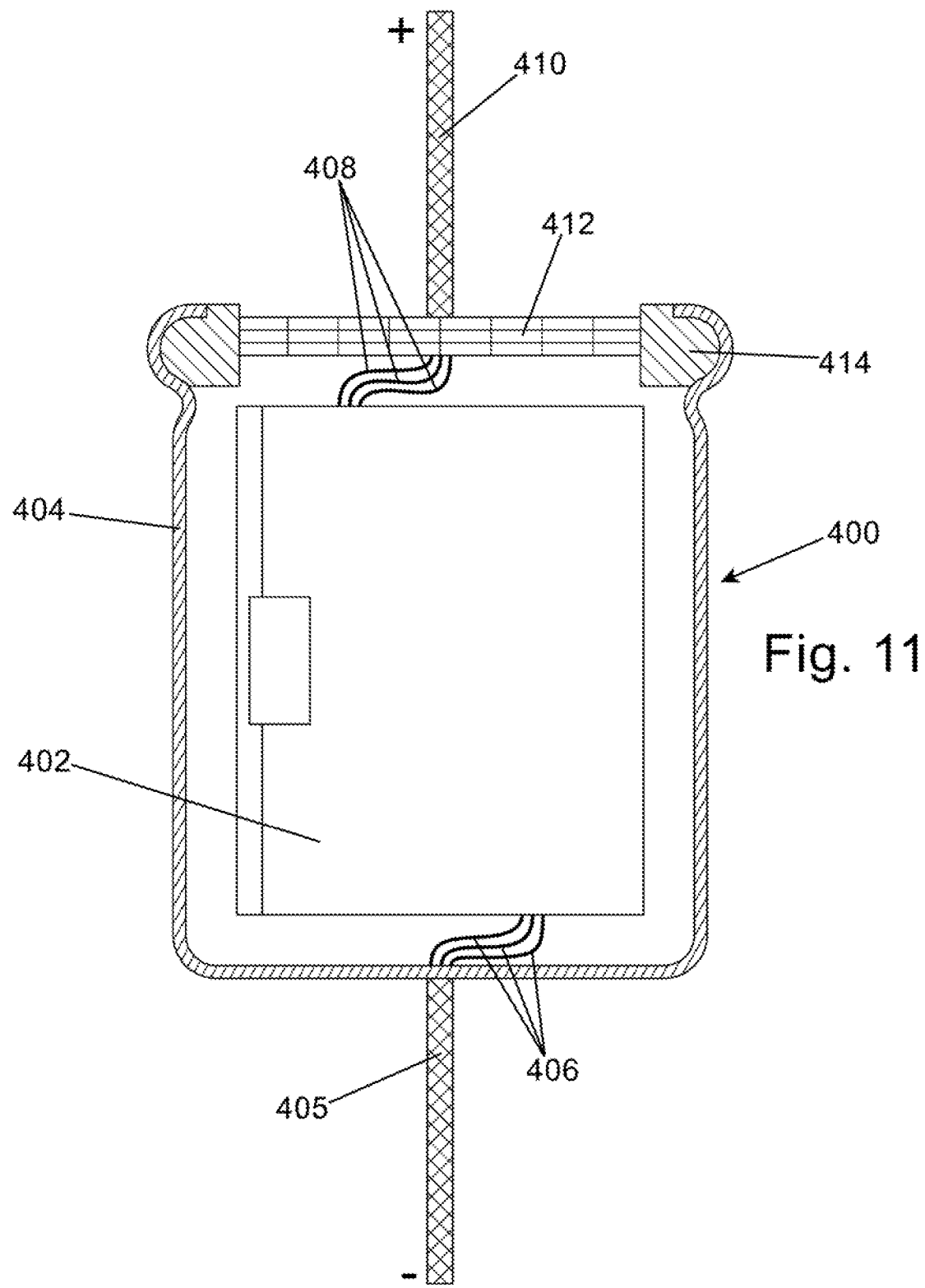
FIG. 11 is a cross-sectional schematic view of an embodiment of the invention.

An axial capacitor is illustrated in cross-sectional schematic view in FIG. 11. In FIG. 11, the capacitor, generally represented at 400, comprises a working element, 402, as described herein, within a housing, 404. The housing, which may be referred to as a can in the art, is preferably conductive and may function as a lead or be in electrical contact with a lower lead, 405, which is preferably the cathode lead. Lower tabs, 406, which are preferably cathode tabs, are in electrical contact with the housing or lower lead. Upper tabs, 408, which are preferably anode tabs, are in electrical contact with an upper lead, 410, which is preferably an anode lead or the upper tabs are in electrical contact with a conductive lid, 412, which is then in electrical contact with the upper lead. A seal, 414, such as a gasket seals the housing to inhibit atmospheric exchange between the interior of the housing and ambient atmosphere. In one embodiment the seal is a hermetic seal.

The anode is a conductive metal preferably in the form of a foil. The conductive metal is preferably a valve metal or a conductive oxide of the valve metal. Particularly preferred anodes comprise a valve metal such as tantalum, aluminum, niobium, titanium, zirconium, hafnium, alloys of these elements, or a conductive oxide thereof such as NbO. Aluminum is a particularly preferred anode material.

An oxide film is formed on the anode as the dielectric. The dielectric may be formed using any suitable electrolyte solution, referred to as a forming electrolyte, such as a phosphoric acid or a phosphate-containing solution. A formation voltage of from about 9 V to about 450 V is commonly applied. The formation voltage typically ranges from 2.0 to 3.5 times the rated voltage of the capacitor.

The conductive polymer application process is generally selected from in-situ polymer formation and application of a preformed polymer from a slurry such as by a coating process. For the in-situ process impregnating solutions are applied to the surface wherein the impregnating solutions preferably contain monomer, oxidizing agent, dopant and other adjuvants as known to those of skill in the art. The selection of a suitable solvent for the solution is well within the level of skill in the art. Examples of suitable solvents include ketones and alcohols such as acetone, pyridine, tetrahydrofuran, methanol, ethanol, 2-propanol, and 1-butanol. The monomer concentration may be from about 1.5 wt. % to about 20 wt. %, more preferably from about 5 wt. % to about 15 wt. % for demonstration of the invention. Suitable monomers for preparing conductive polymers include but are not limited to aniline, pyrrole, thiophene, and derivatives thereof. A preferred monomer is 3,4-ethylenedioxythiophene. The oxidizing agent concentration may be from about 6 wt. % to about 45 wt. % and more preferably from about 16 wt. % to about 42 wt. % for demonstration of the invention. Oxidizing agents for preparing conductive polymers include Fe(III) salts of organic and inorganic acids, alkali metal persulfates, ammonium persulfate, and others. A preferred oxidant for demonstration of the invention is Fe(III) tosylate. The dopant concentration may be from about 5 wt. % to about 30 wt. % and more preferably from about 12 wt. % to about 25 wt. %. Any suitable dopant may be used, such as dodecyl benzenesulfonate, p-tosylate, or chloride. The preferred dopant is p-tosylate. The pellets are cured at a temperature of from 65° C. to about 160° C. and more preferably from about 80° C. to about 120° C. thereby allowing the monomer to polymerize. After curing, the polymer layer is preferably washed in deionized water or another solvent.

Application of a preformed polymer from a slurry is a preferred method. The polymer can be prepared as a slurry or obtained commercially as a slurry and applied to the surface, without particular limit to the technique, preferably followed by drying. A slurry of polymerized 3,4-ethylenedioxythiophene with a particle size of at least 1 nm to no more than 200 nm, more preferably at least 20 nm to no more than 200 nm, in a solvent is exemplary for demonstration of the invention. For application to the separator it is preferable that the slurry be allowed to impregnate the separator sufficiently prior to drying. It is preferable that a continuous coating of conductive polymer be applied to maximize the surface area of conductivity. In a particularly preferred embodiment at least 80% of the surface area of the anode and at least 80% of the surface area of the cathode is coated with conductive polymer. More preferably, at least 90% of the surface area of the anode and at least 90% of the surface area of the cathode is coated with conductive polymer and most preferably at least 99% of the surface area of the anode and at least 99% of the surface area of the cathode is coated with conductive polymer.

The liquid electrolyte is a solvent preferably with a supporting salt therein. Any conventional solvent can be used with exemplary solvents including γ-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof. Though not required a supporting salt is preferred. Exemplary supporting salts include inorganic acid ammonium salts, inorganic acid amine salts, inorganic acid alkyl substituted amide salts, organic ammonium salts, organic acid amide salts, organic acid alkyl substituted amide salts and derivatives thereof. Any gas absorbents or cathode electrochemical depolarizers can be used. Exemplary supported additives include nitro derivatives of organic alcohols, acids, esters, aromatic derivatives such as o-, m-, p-nitroanisole, o-,m-,p-nitrobenzoic acid, o-,m-,p-nitrobenzene alcohol. A particularly hybrid capacitor comprises up to 50 wt % liquid electrolyte.

The separator is not particularly limited herein and any commercially available separator can be used to demonstrate the invention with the proviso that it is a material used for the conductive separator can either be coated with, or impregnated with, a conductive polymer. Alternatively, or in addition to the conductive polymer, the separator may itself be a conductive material. Exemplary separators for the conductive separator function as a skeleton layer for the conductive polymer. The separator can be fabricated in the form of a sheet of different dimensions which can be wound in rolls, reels etc. or the separator can be in the form of a paste or gel. The anode foil can function as a support for the separator wherein the anode foil has an insulator layer formed on the surface thereof with a conductive polymer coating on the insulator and with a conductive separator layer formed on the polymer coating. The use of the anode as a support may minimize operating difficulty. The separator is a porous conductive layer which allows direct electrical contact between the anode conductive polymer layer and a cathode. Preferably, the separator has a volume of pores for liquid electrolyte to transit through. Paper or other non-conductive materials, such as polymers, can be used as support for the conductive polymer. Paper is an exemplary separator due to the widespread use and availability. Unlike prior art capacitors the paper does not need to be charred for use as a conductive separator. In the manufacture of prior art capacitors the paper is often charred after formation of the working element to minimize the amount of polymer absorbed into the paper. With the present invention this is unnecessary since the separator is either coated with conductive polymer or impregnated with conductive polymer to form the conductive separator. The separator may be a fibrous material, such as paper fiber, either physically intermingled or cross-linked to form a continual fibrous, such as paper fiber, layer. The space between the fibers might be partly or fully filled with the high conductivity component. Paper based separators can be manufactured by modification of a finished paper layer or by modification of paper with high conductivity component fibers before forming of paper layer, a dispersion of conductive fibers, pieces, particles or their agglomerates in a liquid or solid state or a deposition of conductive fibers, pieces, particles. The conductive fibers, pieces or particles may comprise a conductive material such as conductive polymer, carbon black, graphite, metal etc., or can be a composite material consisting of a non-conductive core such as paper, plastic etc., modified with a conductive material such as conductive polymer, carbon black, graphite, metal etc.

The conductive separator and non-conductive separator may comprise the same material with the conductive separator having a conductive coating thereon or being impregnated with a conductor neither of which is necessary in the non-conductive separator.

A particularly preferred separator has a width which is suitable for the working element length or production process with a width of 1.5 cm to 500 cm being exemplary for demonstration of the invention. The length is chosen based on the desired capacitance as capacitance is a function of anode and cathode overlap and is therefore directly related to length and width of the cathode and anode. A separator with a length of for 0.1 m to 400 m and thickness of 10 μm up to 300 μm is exemplary for demonstration of the invention.

The conductive polymer is preferably selected from polyaniline, polypyrrole and polythiophene or substitutional derivatives thereof.

A particularly preferred conducting polymer is represented by Formula I:

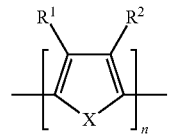

FORMULA 1 wherein $R^1$ and $R^2$ are chosen to prohibit polymerization at the β-site of the ring. It is most preferred that only α-site polymerization be allowed to proceed. Therefore, it is preferred that $R^1$ and $R^2$ are not hydrogen. More preferably, $R^1$ and $R^2$ are α-directors. Therefore, ether linkages are preferable over alkyl linkages. It is most preferred that the groups be small to avoid steric interferences. For these reasons $R^1$ and $R^2$ taken together as —O—(CH$_2$)$_2$—O— is most preferred. In Formula 1, X is S or N and most preferable X is S. A particularly preferred conductive polymer is polymerized 3,4-polyethylene dioxythiophene (PEDOT).

$R^1$ and $R^2$ independently represent linear or branched C1-C16 alkyl or C2-C18 alkoxyalkyl; or are C3-C8 cycloalkyl, phenyl or benzyl which are unsubstituted or substituted by C1-C6 alkyl, C1-C6 alkoxy, halogen or OR3; or R1 and R2, taken together, are linear C1-C6 alkylene which is unsubstituted or substituted by C1-C6 alkyl, C1-C6 alkoxy, halogen, C3-C8 cycloalkyl, phenyl, benzyl, C1-C4 alkylphenyl, C1-C4 alkoxyphenyl, halophenyl, C1-C4 alkylbenzyl, C1-C4 alkoxybenzyl or halobenzyl, 5-, 6-, or 7-membered heterocyclic structure containing two oxygen elements. R3 preferably represents hydrogen, linear or branched C1-C16 alkyl or C2-C18 alkoxyalkyl; or are C3-C8 cycloalkyl, phenyl or benzyl which are unsubstituted or substituted by C1-C6 alkyl.

As typically employed in the art, various dopants can be incorporated into the polymer during the polymerization process. Dopants can be derived from various acids or salts, including aromatic sulfonic acids, aromatic polysulfonic acids, organic sulfonic acids with hydroxy group, organic sulfonic acids with carboxylhydroxyl group, alicyclic sulfonic acids and benzoquinone sulfonic acids, benzene disulfonic acid, sulfosalicylic acid, sulfoisophthalic acid, camphorsulfonic acid, benzoquinone sulfonic acid, dodecylbenzenesulfonic acid, toluenesulfonic acid. Other suitable dopants include sulfoquinone, anthracenemonosulfonic acid, substituted naphthalenemonosulfonic acid, substituted benzenesulfonic acid or heterocyclic sulfonic acids as exemplified in U.S. Pat. No. 6,381,121 which is included herein by reference thereto.

Binders and cross-linkers can be also incorporated into the conductive polymer layer if desired. Suitable materials include poly(vinyl acetate), polycarbonate, poly(vinyl butyrate), polyacrylates, polymethacrylates, polystyrene, polyacrylonitrile, poly(vinyl chloride), polybutadiene, polyisoprene, polyethers, polyesters, silicones, and pyrrole/acrylate, vinylacetate/acrylate and ethylene/vinyl acetate copolymers.

Other adjuvants, coatings, and related elements can be incorporated into a capacitor, as known in the art, without diverting from the present invention. Mentioned, as a non-limiting summary include, protective layers, multiple capacitive levels, terminals, leads, etc.

A particular feature of the invention is the ability to provide a capacitor with a high voltage. By utilizing the conductive separator a capacitor with a rated voltage capability of 15 V to 250 V can be obtained. Furthermore, the capacitors can be made larger such as a diameter of 10 mm to 30 mm and larger with lengths of 15 mm to 50 mm or larger.

Comparative Study

Figure 5:
FIG. 5 is a schematic representation illustrating an advantage of the invention.

The deficiencies of the prior art hybrid capacitors can be realized by observing the components in a commercially available product such as a capacitor with a working element having a diameter of about 10 mm and length of about 8 mm. The impact of the filtration process is visually indicated as unevenly coated foil and separator with a concentration of conductive polymer located around the last turn of the winding and in the bottom of the winding. In exemplary cases less than 40% of the foil is coated with conductive polymer indicating at least 60% of the foil is ineffective at fully contributing to the capacitance. FIG. 5 provides a schematic representation of the differences between the prior art and the instant invention wherein only the outer extent of the prior art anode, represented by A, is coated with the central portion lacking any conductive polymer coating whereas, for the inventive example, represented by B, the entire surface is coated with conductive polymer.

Inventive Example 1 (I-1)

Anodized aluminum anode foils and aluminum cathode foils of sizes and capacitance rating as shown in Table 1 were heat treated at 300±5° C. for 30±5 min. The anode foil was subjected to a first edge formation treatment by immersing in 5% oxalic acid at 30±5° C. at a voltage of 5 mA/cm². The foil was washed for a minimum of 5 minutes and dried at 125±5° C. for 25-30 min. The anode foil was heat treated at 300±5° C. for 30±5 min followed by a second edge formation in 1% ammonium citrate at a voltage of 1.5 mA/cm² at 50±5° C. followed by washing for at least 5 min and drying at 125±5° C. for 25-30 min. The anode and cathode were subjected to a silane treatment for 15-30 sec. in a solution comprising 4935 ml+/−50 ml DI Water, 15 ml+/−0.5 ml acetic acid and 50 ml+/−1 ml 3-glycidoxypropyltrimethoxysilane at a pH of 3.0+/−1.0. The anode and cathode foils were again heat treated 300±5° C. for 30±5 min. The anode was anodized again to oxidize the edges in 0.1% ammonium phosphate at a voltage of 1.5 mA/cm² at 55±5° C. followed by washing for at least 5 minutes and drying at 125±5° C. for 25-30 minutes. The silane treatment was repeated for 15-30 seconds followed by air drying for 15-20 min. The silane was cured at 125+/−5° C. 15+/−3 minutes. The conductive polymer layer was applied by pulling the anode and cathode through a slurry comprising poly-3,4-ethylenedioxythiophene (PEDOT) and polystyrene sulfonate (PSS) at a speed of 3 mm/sec followed by drying initially at 80° C. for about 10 min then at 150° C. for about 10 minutes followed by allowing the coatings to cool down to room temperature. The polymer coating was repeated three times with drying between coats. The percentage of projective and real surface area covered with polymer was observed to be about 100% for all components including the cathode foil, anode foil, and separator. All components were observed to be flexible and suitable for winding as an axial capacitor without generating cracks. The components are stable during long term storage. The capacitors were tested and the results are presented in Table 1.

Inventive Example 2 (1-2)

Example 1 was repeated except for application of the polymer which was applied by spraying a slurry with the same observed coverage as in Inventive Example 1.

Comparative Example 1 (C-1)

Samples were made using same anodes and cathodes as Inventive Example 1 except that the conductive polymer was added by prior art methods as set forth in U.S. Pat. No. 8,767,377. The results are presented in Table 1.

TABLE 1

| Process | Size (Diameter × Length), mm | $V_R$, V | Capacitance, uF | CV, mF * V |
|---------|------------------------------|----------|-----------------|------------|
| I-1     | D10 × L20 + Polymer          | 40       | 116             | 4.64       |
| C-1     | D20 × L27 + Polymer          | 40       | 570             | 22.8       |
| I-1     | D20 × L27 + Polymer          | 40       | 1480            | 59.2       |
| C-1     | D20 × L27 + Polymer          | 63       | 158             | 9.95       |
| I-1     | D20 × L27 + Polymer          | 63       | 480             | 30.24      |

In Table 1, $V_R$ is rated voltage and CV is capacitance× volts. In the examples the capacitance, with the same size anode and cathode, was almost three times as high for the inventive example as for the comparative example.

Figure 6:
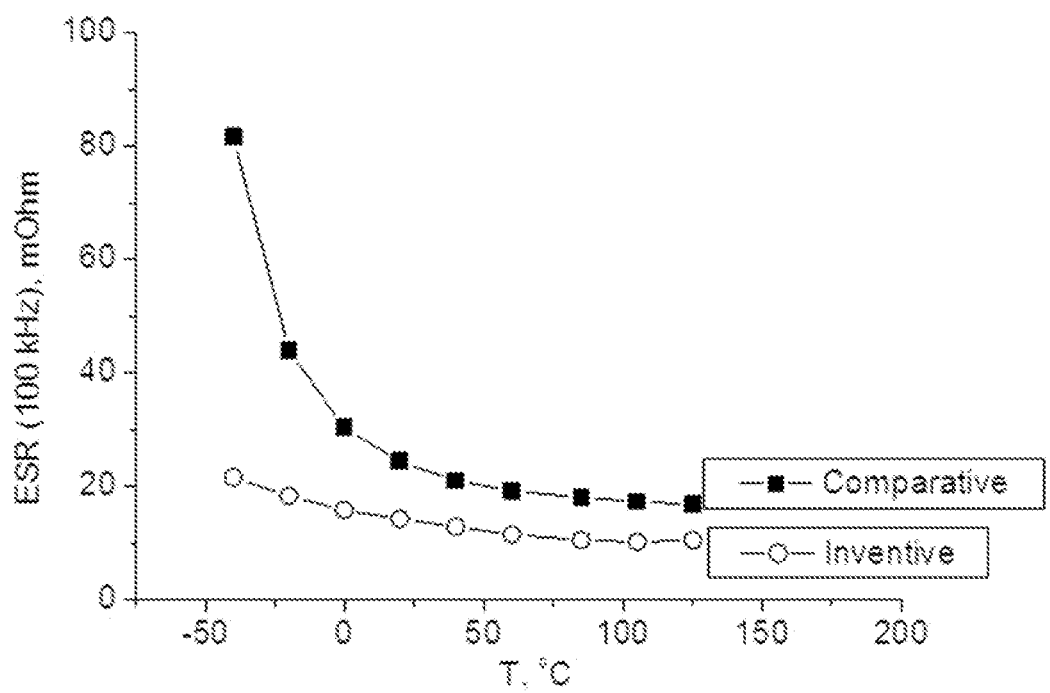
FIGS. 6-10 are graphical representations illustrating advantages of the invention.
Figure 7:
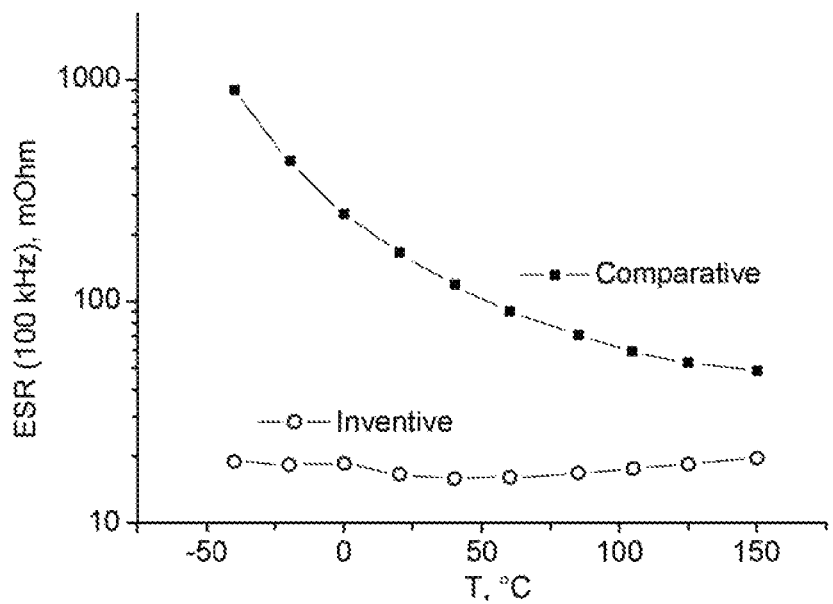
Figure 8:
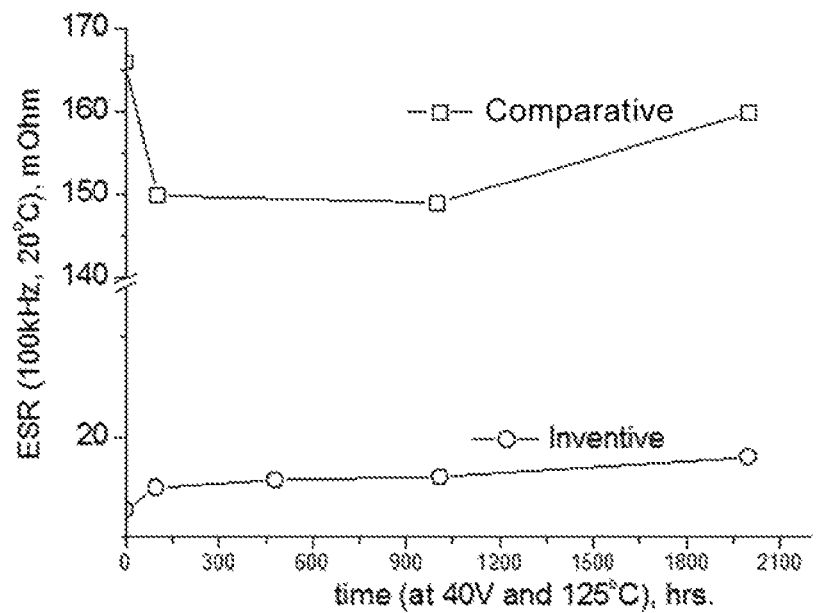
Figure 9:
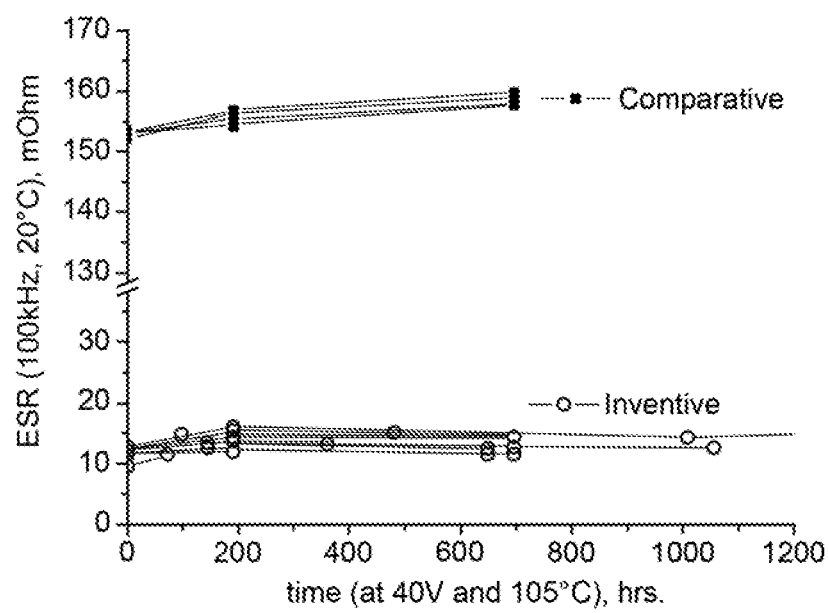
Figure 10:
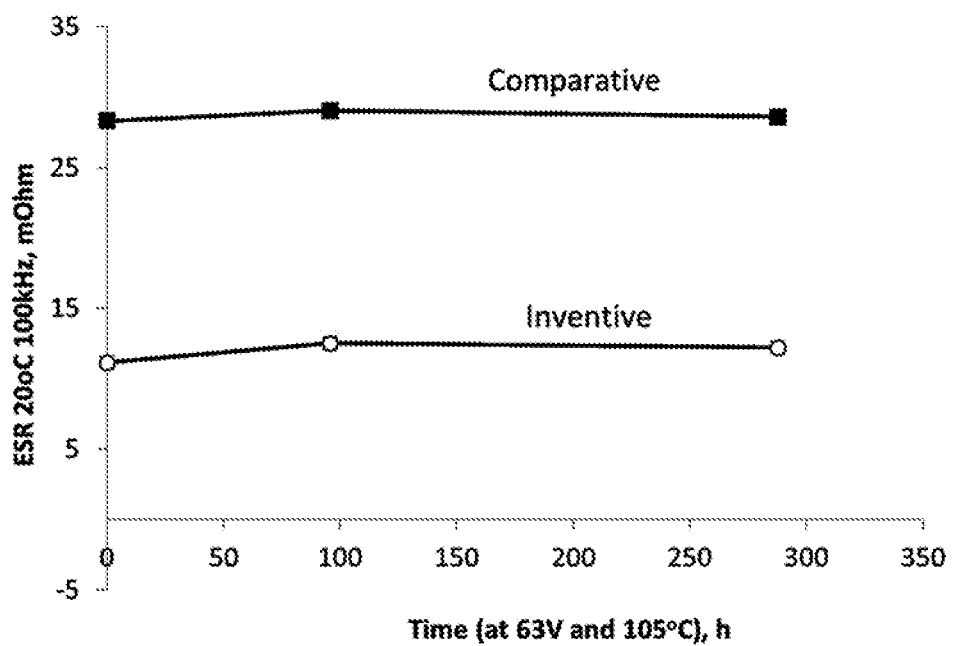

The results obtained for the inventive examples was successfully applied for manufacturing of axial capacitors of various case sizes. CV for 40-63V capacitors was approximately three times higher for the inventive examples than for the comparative examples. Life tests demonstrated that manufactured prototypes demonstrate high stability during several toughen hours at high temperature and rated voltages. Low ESR and suppressed temperature dependence were achieved for the prototypes at the same time with high CV values. FIGS. 6-10 illustrate the advantages of the invention. FIG. 6 illustrates the improvement in ESR as a function of temperature for an inventive axial capacitor with diameter of 20 mm and length of 27 mm with a rated voltage of 40 V. FIG. 7 illustrates the improvement in ESR as a function of temperature for an inventive axial capacitor with diameter of 10 mm and length of 20 mm with a rated voltage of 40 V. FIG. 8 illustrates the improvement in ESR as a function of time at 125° C. for an inventive axial capacitor with diameter of 10 mm and length of 20 mm with a rated voltage of 40 V. FIG. 9 illustrates improvements in ESR as a function of time at 105° C. for a series of prior art, comparative, hybrid 40 V capacitors versus a series of inventive capacitors and FIG. 10 illustrates improvements in ESR as a function of time at 105° C. for a comparative, hybrid 63 V capacitor versus an inventive capacitor.

A series of capacitors were prepared for a determination of the ESR shift as a function of frequency. A control axial electrolytic capacitor was prepared as were an fully asymmetrical capacitor, as described herein, a symmetrical capacitor, having conductive polymer on both sides of the anode and having a single polymer layer coated on the dielectric, designated HAC-1, and a symmetrical capacitor, having conductive polymer on both sides of the anode having three polymer layers coated on the dielectric, designated HAC-3. The advantages of the invention, and additional conductivity in the conductive polymer layer by the use of additional coated layers, is illustrated graphically in FIG. 18

The invention has been described with reference to the preferred embodiments without limit thereto. One of skill in the art would realize additional embodiments and improvements which are not specifically set forth herein but which are within the scope of the invention as more specifically set forth in the claims appended hereto.

The invention claimed is:

1. A capacitor comprising:
   a working element comprising:
   an asymmetrical anode comprising a first dielectric on a first side and a second dielectric on said second side and an anode conductive polymer layer on said first dielectric but not on said second dielectric;
   a cathode; and
   a separator between said anode conductive polymer layer and said cathode;
   an anode lead in electrical contact with said anode; and
   a cathode lead in electrical contact with said cathode.

2. The capacitor of claim 1 wherein said cathode comprises a cathode conductive polymer layer.

3. The capacitor of claim 1 comprising a second separator between said second dielectric and said cathode.

4. The capacitor of claim 3 wherein said second separator is a second conductive separator.

5. The capacitor of claim 3 wherein said second separator is a non-conductive separator.

6. The capacitor of claim 1 wherein said anode lead and said cathode lead are on different sides of said capacitor.

7. The capacitor of claim 6 wherein said anode lead and said cathode lead are on opposite sides of said capacitor.

8. The capacitor of claim 1 further comprising a liquid electrolyte between said anode conductive polymer layer and said cathode.

9. The capacitor of claim 8 comprising up to 50 wt % of said liquid electrolyte.

10. The capacitor of claim 8 wherein said liquid electrolyte is a solvent.

11. The capacitor of claim 10 wherein said solvent is selected from the group consisting of y-butyrolactone, sulfolane, ethylene carbonate, propylene carbonate, dimethyl carbonate, ethyl methyl carbonate, acetonitrile, propionitrile, dimethyl formamide, diethyl formamide, water, silicone oil, polyethylene glycol and mixtures thereof.

12. The capacitor of claim 10 wherein said solvent has a supporting salt therein.

13. The capacitor of claim 12 wherein said supporting salt is selected from the group consisting of inorganic acid ammonium salts, inorganic acid amine salts, inorganic acid alkyl substituted amide salts, organic ammonium salts, organic acid amide salts, organic acid alkyl substituted amide salts and derivatives thereof.

14. The capacitor of claim 8 wherein said liquid electrolyte further comprises gas absorbents or cathode electrochemical depolarizers.

15. The capacitor of claim 8 wherein said liquid electrolyte further comprises additives selected from the group consisting of nitro derivatives of organic alcohols, acids, esters and aromatic derivatives.

16. The capacitor of claim 15 wherein said aromatic derivatives are selected from the group consisting of o-nitroanisole, m-nitroanisole, p-nitroanisole, o-nitrobenzoic acid, m-nitrobenzoic acid, p-nitrobenzoic acid, o-nitrobenzene alcohol, m-nitrobenzene alcohol and p-nitrobenzene alcohol.

17. The capacitor of claim 8 wherein said hybrid capacitor comprises up to 50 wt % of said liquid electrolyte.

18. The capacitor of claim 1 wherein said anode conductive polymer layer covers at least 80% of a surface area of said first dielectric or at least 80% of a surface area of said cathode comprises a cathode conductive polymer layer.

19. The capacitor of claim 18 wherein said anode conductive polymer layer covers at least 90% of said surface area of said first dielectric or said cathode conductive polymer layer covers at least 90% of said surface area of said cathode.

20. The capacitor of claim 1 wherein said separator is a conductive separator.

21. The capacitor of claim 20 wherein said conductive separator comprises a conductive polymer.

22. The capacitor of claim 21 wherein said conductive separator comprises a material with said conductive polymer coated on said material or said conductive polymer impregnates said separator.

23. The capacitor of claim 21 wherein at least one of said conductive polymer, or said anode conductive polymer comprises a polymer selected from the group consisting of polyaniline, polythiophene and polypyrrole.

24. The capacitor of claim 23 wherein said conductive polymer is poly 3,4-ethylenedioxythiophene.

25. The capacitor of claim 1 comprising multiple anode leads or multiple cathode leads.

26. The capacitor of claim 1 wherein at least one of said anode or said cathode comprises a valve metal.

27. The capacitor of claim 26 wherein said valve metal is selected from the group consisting of tantalum, aluminum, niobium, titanium, zirconium, hafnium, alloys of these elements and a conductive oxide thereof.

28. The capacitor of claim 27 wherein said valve metal is aluminum.

29. The capacitor of claim 1 wherein at least one of said anode, said cathode or said separator has a conductive polymer coating of at least 0.1 $mg/cm^2$ to no more than 10 $mg/cm^2$.

30. The capacitor of claim 1 having a diameter of at least 10 mm to no more than 30 mm.

31. The capacitor of claim 1 having a length of at least 15 mm to no more than 50 mm.

32. The capacitor of claim 1 having a rated voltage of at least 15 volts to no more than 250 volts.

33. The capacitor of claim 1 wherein adjacent conductive polymer layers are in physical contact.

34. A capacitor comprising:
   a working element comprising:
   an asymmetrical anode comprising a first dielectric on a first side and a second dielectric on said second side and an anode conductive polymer layer on said first dielectric;
   a cathode; and
   a separator between said anode conductive polymer layer and said cathode;
   an anode lead in electrical contact with said anode;

a cathode lead in electrical contact with said cathode; and comprising a second anode conductive polymer layer on only a portion of said second dielectric.

35. The capacitor of claim 34 wherein at least 25% to no more than 99% of a surface area of said second dielectric comprises a conductive polymer coating.

* * * * *